United States Patent [19]
Fox et al.

[11] 3,892,140
[45] July 1, 1975

[54] ROTARY DRIVE APPARATUS

[75] Inventors: Roy K. N. Fox; Rowan W. Patterson, both of Norfolk, England

[73] Assignee: Weatherford Oil Tool (UK) Ltd., Norfolk, England

[22] Filed: May 1, 1974

[21] Appl. No.: 465,947

[30] Foreign Application Priority Data
May 7, 1973 United Kingdom............. 21753/73
Nov. 2, 1973 United Kingdom............. 51078/73

[52] U.S. Cl. ............... 74/224; 74/221; 175/195
[51] Int. Cl. ..................... F16h 7/00; E21b 3/04
[58] Field of Search .......... 175/113, 122, 195, 256, 175/224 U, 221 X

[56] References Cited
UNITED STATES PATENTS

| | | | |
|---|---|---|---|
| 952,156 | 3/1910 | Trewhella | 74/224 X |
| 2,523,159 | 9/1950 | Stone | 74/221 X |
| 3,097,834 | 7/1963 | Hurst | 74/224 X |
| 3,598,188 | 8/1971 | Foster | 175/195 X |

*Primary Examiner*—Leonard H. Gerin
*Attorney, Agent, or Firm*—Fulbright & Jaworski

[57] ABSTRACT

A rotary drive apparatus for a casing tong, drill spinner or the like. The apparatus has a drive wheel and idler wheels adapted to drive an endless loop member trained around a cylindrical member to be driven.

8 Claims, 8 Drawing Figures

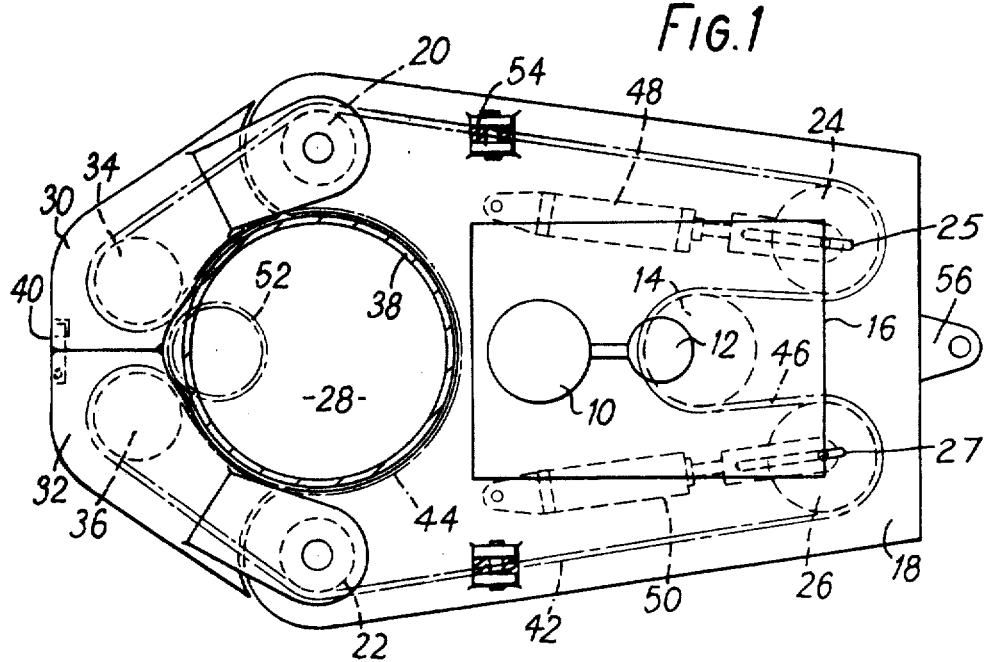
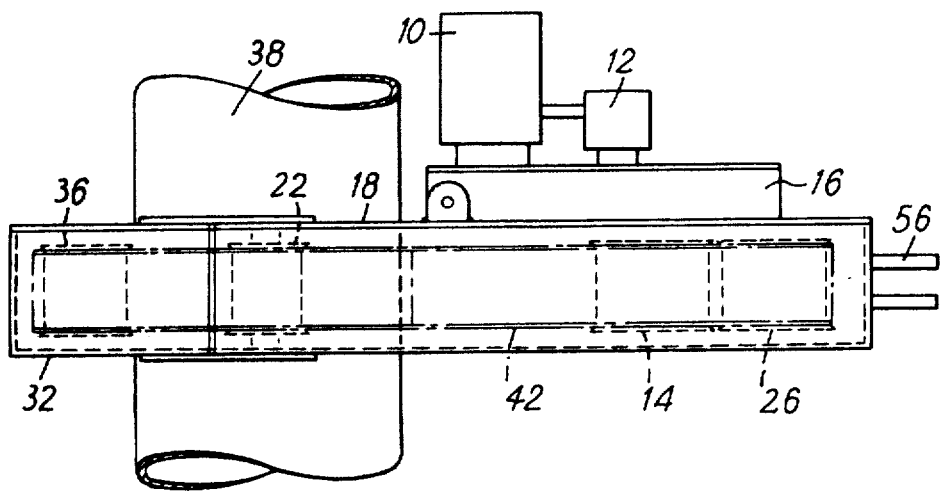

ROTARY DRIVE APPARATUS

This invention relates to a rotary drive apparatus and particularly, but not exclusively, to such apparatus suitable for use as a casing tong in drilling operations.

A casing tong can be used in the drilling industry to screw together sections of casing which are placed in a drill hole after drilling and then cemented into place. A known casing tong uses toothed members to grip the casing and a hydraulic motor rotates the toothed members, but such a tong is inconvenient to use.

Although the invention is principally concerned with a casing tong, the invention is also applicable to other rotary drive apparatus for rotating and applying torque to a cylindrical member. For example, the invention is applicable to a drill spinner for use in making up and breaking out spans of drill pipe in a bore hole. A known drill spinner, using a pneumatic motor and belt drive, includes means for clasping a bight in an endless belt around the drill pipe and a pneumatic motor for driving the belt. The torque obtainable is limited and adjustment of the spinner to different sizes of pipe is inconvenient.

The object of the present invention is to provide an improved construction of rotary drive apparatus which, whilst being simple to engage onto and remove from a cylindrical member such as a drill hole casing or a drill pipe, can nevertheless exert relatively high torque on the cylindrical member.

According to the present invention a rotary drive apparatus, for applying rotational torque to a cylindrical member, comprises a body structure including a recess to receive said cylindrical member, a drive wheel journalled on said body structure, a plurality of idler wheels journalled on said body structure, an endless loop trained round said drive wheel and around said idler wheels and adapted to form a re-entrant bight in said recess, said body structure including at least one jaw bearing at least one of said idler wheels and positioned adjacent said recess, said jaw being pivotable between an open position in which said recess is open for insertion and removal of said cylindrical member from said bight and a closed position in which said bight is clasped about said cylindrical member, means for retaining said at least one jaw in said closed position, and means for displacing at least another of said idler wheels remote from said jaw for adjustment of the size of said bight and to tension said loop.

In a convenient arrangement, motor drive means are mounted on said body structure for rotating said drive wheel, e.g. a hydraulic motor which may act through a gear box.

The means for displacing at least another of said idler wheels may be an hydraulic piston-and-cylinder means, and preferably said displacing means includes two independently controllable displacing means for displacing respective ones of the idler wheels contacted by the loop on respective sides of the drive wheel.

In a first form, the endless loop is a chain, and the drive wheel is a sprocket.

In a second form, the drive wheel and said endless loop present respective profiled surfaces capable of engagement, upon tensioning of said loop, to exert shear forces for transmission of drive torque, from said drive wheel to said endless loop, sufficient to rotate said cylindrical member. By way of example, said endless loop may be a chain having links whose periphery is profiled for engagement by the profiled surface of the drive wheel, or said endless loop may be a toothed belt. Some or all of the idler wheels may have similarly profiled surfaces.

The apparatus is preferably arranged such that the endless loop makes contact with not less than 180° of the circumference of the cylindrical member, and of the circumference of the drive wheel.

The drive is due to the frictional contact between the profiled outer surface of the drive wheel and the similarly profiled outer preriphery of the links of the chain. This frictional contact increases with the torque to be applied to the cylindrical member depending on the tension applied to the chain. If the tension is released, the chain will slip on the drive wheel. The optimum tension is that which just allows the correct torque to be transmitted to the cylindrical member without chain slip over the profiled surface of the drive wheel.

Means may be included for supporting the bight of the endless loop engaged about the cylindrical member, and in a preferred form said supporting means comprises a flanged roller journalled on an arm pivoted on the body structure and loaded to urge the roller towards the periphery of the cylindrical member such that the bight of the endless loop is supported on the flange of the roller.

An embodiment of the present invention, and some modifications thereof, will now be described by way of example with reference to the accompanying drawings, wherein:

FIG. 1 is a plan view of a casing tong;

FIG. 2 is a side elevation of the casing tong;

Figure 3:
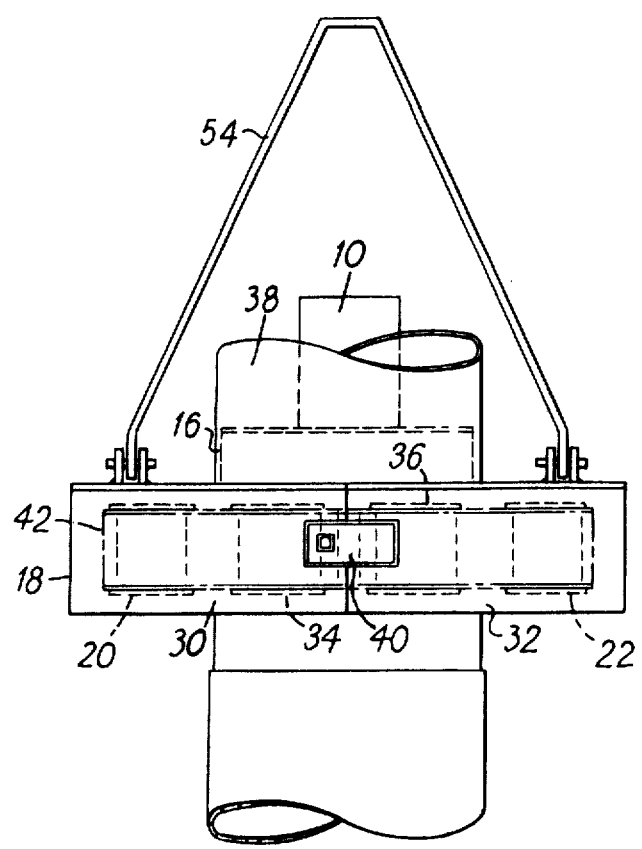
FIG. 3 is an end view of the casing tong.

Referring now to FIGS. 1 to 3, a casing tong comprises a hydraulic motor 10 controlled by a control valve 12 and driving a sprocket wheel 14 through a gearbox 16. The drive sprocket 14 is mounted in a housing 18 which provides a frame supporting the gearbox and motor and also containing idler rollers 20, 22, 24 and 26. The idler rollers 20 and 22 are mounted on opposite sides of a recess 28 in the housing 18. Jaws 30 and 32 are mounted on the housing 18 for pivotal movement about the same axes as the rollers 20 and 22 respectively. The jaws 30 and 32 bear further idler rollers 34 and 36 respectively and are pivotable between open positions in which a casing section such as 38 may be inserted in the recess 28 between the separated rollers 34 and 36, and closed positions, as shown in the drawings, in which the rollers 34 and 36 are brought adjacent each other, a preferably automatic latch 40 being provided for retaining the jaws 30 and 32 in the closed position.

Guide rollers may be provided on the body structure and/or on the jaws, to be contacted by the casing and thus reduce vibration. These guide rollers may be constituted by an axially thickened upper and lower flange similar to the flange 66 in FIG. 4, and the idler rollers carried by the jaws may each be similarly profiled in the manner shown in FIG. 4.

If desired, hydraulic piston and cylinder devices (see FIG. 7) may be provided instead of or in addition to the latch 40, to open and close the jaws 30 and 32, or they may be opened by hydraulic means acting against return springs.

The rollers 24 and 26 are mounted at the opposite end of the casing tong from the recess 28 on opposite sides of the drive sprocket 14 and an endless loop of chain 42 is trained around the idler rollers 20, 22, 24, 26, 34 and 36, with a re-entrant bight 44 between the rollers 34 and 36 extending into the recess 28 for receiving and embracing the casing 38 and with a further re-entrant bight 46 between the rollers 24 and 26 trained round the drive sprocket 14.

The rollers 24 and 26 are mounted on the shafts guided in slots such as 25 and 27 in the casing 38, the shafts being mounted on pistons of respective hydraulic rams 48 and 50 preferably positioned inside the casing and which are independently controllable by means of control valves (not shown) to displace the rollers 24 and 26 in the housing 18 generally towards and away from the idler rollers 20 and 22 respectively so as to lengthen or shorten the bight 44. Thus, the size of the bight 44 can be adjusted to suit casing diameter at maximum substantially equal to the diameter of the recess 28 or at minimum approximately a factor of three smaller than this as indicated at 52 (e.g. between 20 inches and 7 inches).

In operation, to apply torque to a casing, the casing tong is lifted by a hanger 54 attached to the housing 18, the jaws 30 and 32 are opened and the bight 44 is applied around the casing 38 (having previously been set to a sufficiently large size by controlling the rams 48 and 50) and the jaws 30 and 32 are then closed and locked closed by the latch 40. A back-up guy is then attached to a clevis 56 secured to the housing adjacent the rollers 24 and 26 to provide a bearing for the casing tong. If the casing 38 is to be rotated clockwise (as seen in FIG. 1) the ram 50 is extended to take up slack in the chain and is then locked in position by closing its control valves. Pressure is then applied to the ram 48 to apply tension to the chain 42 and the hydraulic motor 10 started. Conversely, for anticlockwise rotation, the ram 48 is first extended and then locked in position before tension is applied by applying pressure to the ram 50. This mode of operation ensures than the ram 48 or 50 bearing the pull of the drive sprocket 14 on the chain 42 is locked in position, while the other ram is in the relatively slack return portion of the chain, thus reducing the pressure requirements for the hydraulic supply to the rams 48 and 50.

It is found that a sufficient grip can be obtained on the casing 38 by the chain 42 engaging the casing directly and it will be appreciated that the casing tong is exceptionally simple to install and operate.

Figure 4:
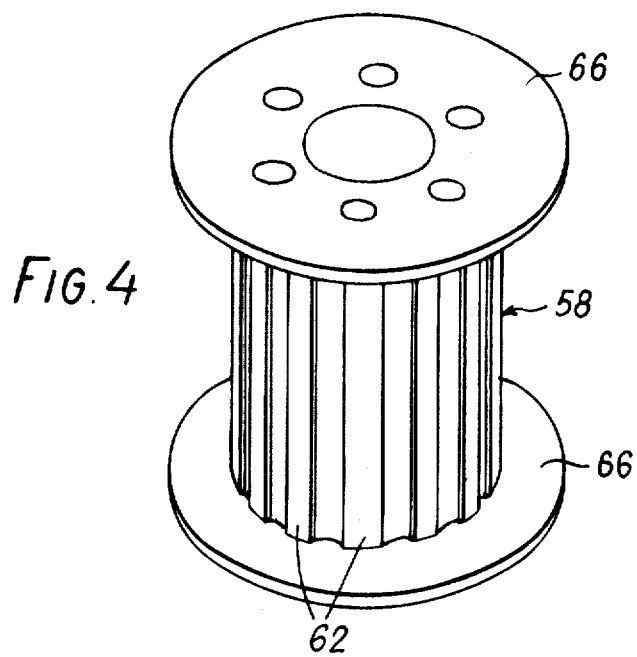
FIG. 4 is a perspective elevation, to an enlarged scale, of a modified drive wheel for use in the casing tong.
Figure 5:
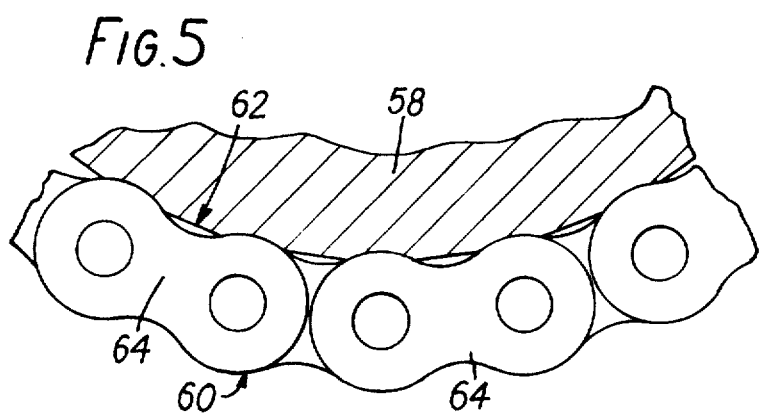
FIG. 5 is an enlarged side elevational view of part of a modified chain, for use in the casing tong of FIG. 1, showing profiled link members.
Figure 6:
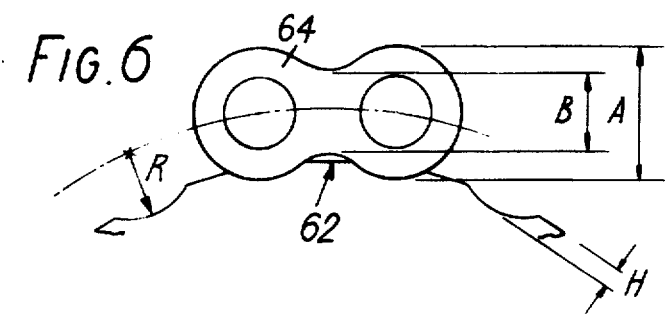
FIG. 6 is a side elevation showing one of the links of the chain of FIG. 5 in engagement with the drive wheel of FIG. 4.

Referring now to FIGS. 4, 5 and 6, the surface of the modified drive wheel 58 which engages with the chain 60 can be seen in FIG. 4 as including a series of truncated projections 62 shaped to engage with correspondingly profiled links 64 of the chain 60 as shown in FIG. 5. Chain retaining plates 66 are provided at each end of the drive roller to support the chain in its proper position.

The drive from the drive wheel 58 is transmitted to the chain 60 by increasing the tension in the chain by means of the rams 48 or 50 (see FIGS. 1 to 3) until the frictional contact between the projections 62 and the profiled links 64 reaches or exceeds the value of the torque to be applied to the casing inserted in the bight 44. If the chain 60 is not tensioned to the correct value, the chain will slip round and over the profiled surface of the drive wheel 58.

The optimum tension for the chain is that which just allows the correct torque to be transmitted to the casing inserted in the bight 44 without the chain slipping on the drive wheel 58.

It is preferable to have the chain 60 making at least 180° angular contact with both the drive wheel 58 and the casing inserted in the bight 44.

With reference to FIG. 6, the profile of the links 64 and the projections 62 on the drive wheel 58 can be calculated as follows:

If $R$ is the radius of truncation

And $H$ is the depth of truncation

And $A$ and $B$ are the chain link dimensions as shown

Then $R$ is approximately $A/2$, and $H$ is approximately $A-B/2$ (less any clearance)

The Pitch Circle Diameter of the drive wheel 58 is entirely dependent on the space available for the drive wheel in the drive arrangement. However, the chain should preferably have a minimum 180° lap and the pitch circle circumference should be divisable by a whole number of chain pitches.

By using a drive arrangement as described with reference to FIGS. 4 to 6, certain advantages are obtained. For instance, because there is no contact between a formed sprocket tooth and an inner link chain roller as in conventional chain and sprocket drives, there is no necessity for the chain to include rollers between the chain side-plate as in a conventional simple, duplex or triplex chain. Thus, the width of the chain can be reduced and greater loads can be transmitted on narrower chains.

Another important advantage is that, with conventional sprocket drives, each different width of chain requires a different sprocket e.g. simple, duplex, triplex etc, whereas with the drive arrangement of FIGS. 4 to 6, any width of chain can be accommodated on one type of drive wheel provided that the pitch of the chain is constant.

Figure 7:
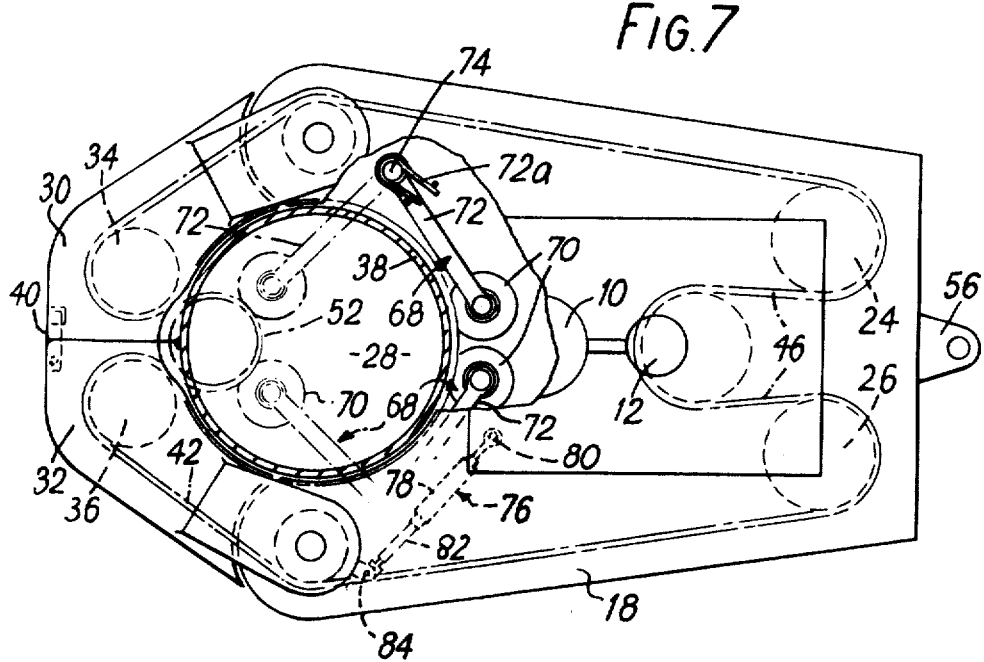
FIG. 7 is a plan view of a modified casing tong including means for supporting the bight engaged about the cylindrical member.
Figure 8:
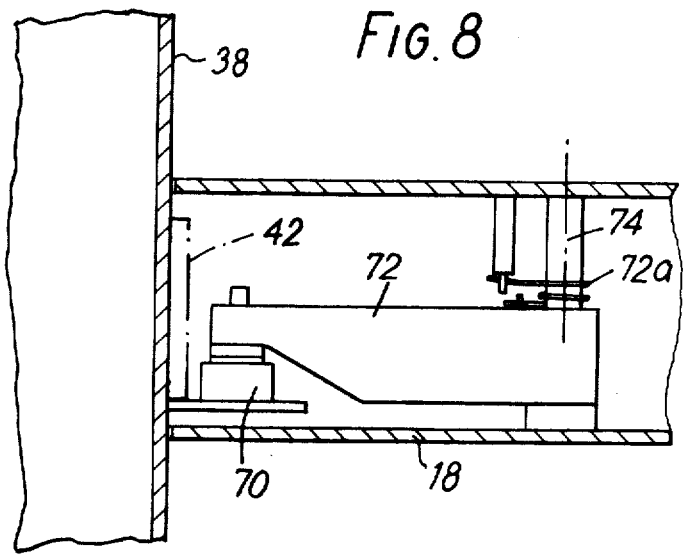
FIG. 8 is a side elevation, to an enlarged scale, of a loop supporting means as seen in FIG. 7.

Referring to FIGS. 7 and 8, there is shown a modified casing tong having a pair of supports 68 each consisting of a flanged rolller 70 journalled at the free end of a radius arm 72 which is pivotably mounted at its other end on the housing 18 for movement about an axis 74. Each arm 72 is spring-urged, by coil spring means 72a in the direction to keep the respective flanged roller 70 in engagement by the periphery of its flange with the surface of the casing 38, whereby the chain 42 rests on and is supported by the flange so that the bight 44 is prevented from dropping down the casing 38.

A hydraulic piston and cylinder device 76 has its cylinder 78 coupled at 80 to the housing, and its piston 82 coupled at 84 to the jaw 32, for opening and/or closing movement of the jaw. A similar arrangement (not shown) is provided for the jaw 30. These items are omitted in FIGS. 1 to 3, for clarity of the drawings, but would be included in the casing tong shown therein.

We claim:

1. A rotary drive apparatus, for applying rotational torque to a cylindrical member, comprising a body structure including a recess to receive said cylindrical member, a drive wheel journalled on said body structure, a plurality of idler wheels journalled on said body structure, an endless loop trained round said drive wheel and around said idler wheels and adapted to form a re-entrant bight in said recess, said body structure including at least one jaw bearing at least one of said idler wheels and positioned adjacent said recess, said jaw being pivotable between an open position in which said recess is open for insertion and removal of said cylindrical member from said bight and a closed position in which said bight is clasped about said cylindrical member, means for retaining said at least one jaw in said closed position, and means for displacing at least another of said idler wheels remote from said jaw for adjustment of the size of said bight and to tension said loop.

2. A rotary drive apparatus, as claimed in claim 1, wherein said displacing means includes two independently controllable displacing means coupled to respective idler wheels contacted by said loop on respective sides of said drive wheel.

3. A rotary drive apparatus, as claimed in claim 1, wherein said drive wheel is a sprocket and wherein said endless loop is a chain.

4. A rotary drive apparatus, as claimed in claim 1, wherein said drive wheel and said endless loop each present respective profiled indented surfaces adapted for engagement, upon tensioning of said loop, to exert shear forces for transmission of drive torque, from said drive wheel to said endless loop, sufficient to rotate said cylindrical member.

5. A rotary drive apparatus, as claimed in claim 4, wherein said endless loop is a chain having links whose periphery is profiled for engagement by the profiled surface of said drive wheel.

6. A rotary drive apparatus, as claimed in claim 1, wherein said endless loop makes contact with not less than 180° of the circumference of said cylindrical member and of the circumference of said drive wheel.

7. A rotary drive apparatus, as claimed in claim 1, including means on said body structure for supporting said bight of said endless loop engaged about said cylindrical member.

8. A rotary drive apparatus, as claimed in claim 7, wherein said supporting means comprises an arm pivotably mounted by one of its ends on said body structure, a flanged roller journalled on said arm remote from said one end, and means acting between said body structure and said arm to urge said flanged roller towards the periphery of said cylindrical member such that said bight of said endless loop is supported on said flange.

* * * * *